April 2, 1929.　　　W. A. CLENCH　　　1,707,458
RIM LOCK AND OPERATING MEANS THEREFOR
Filed Sept. 8, 1925　　4 Sheets-Sheet 1

INVENTOR
William A. Clench
BY H.L. + S.L. Reynolds
ATTORNEYS

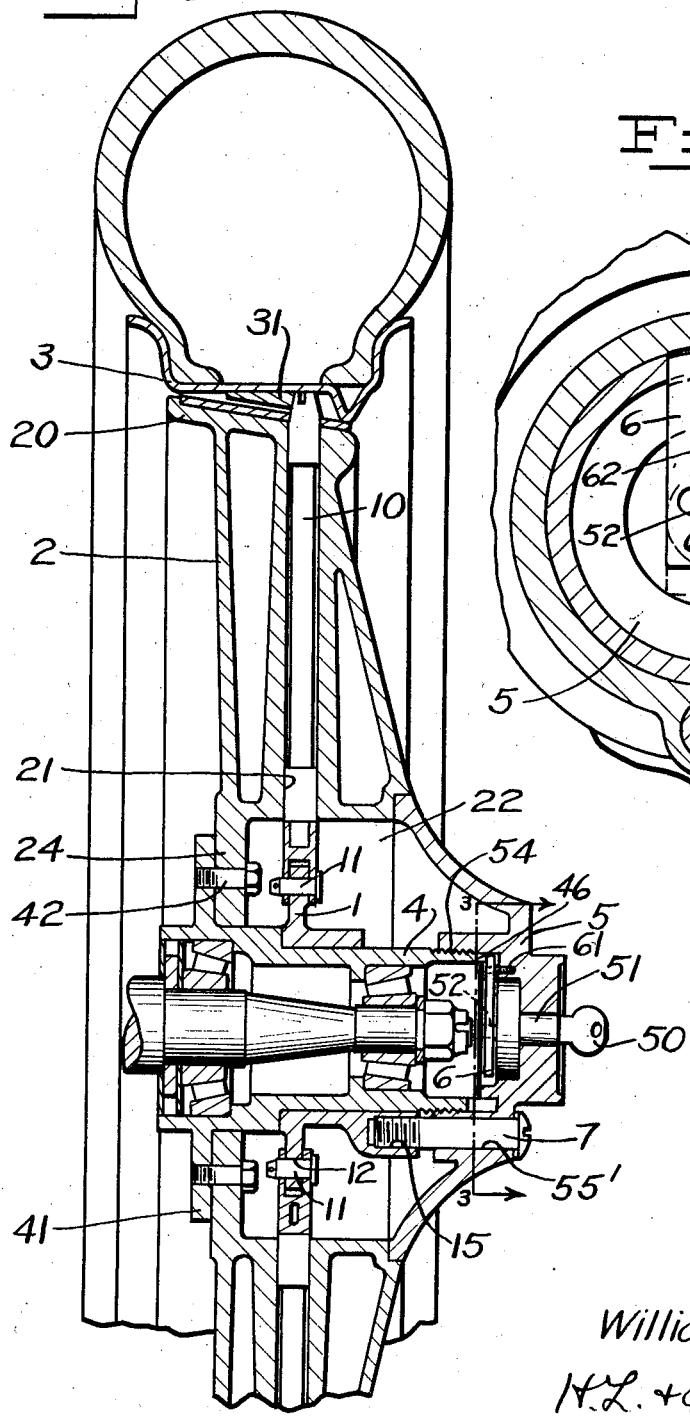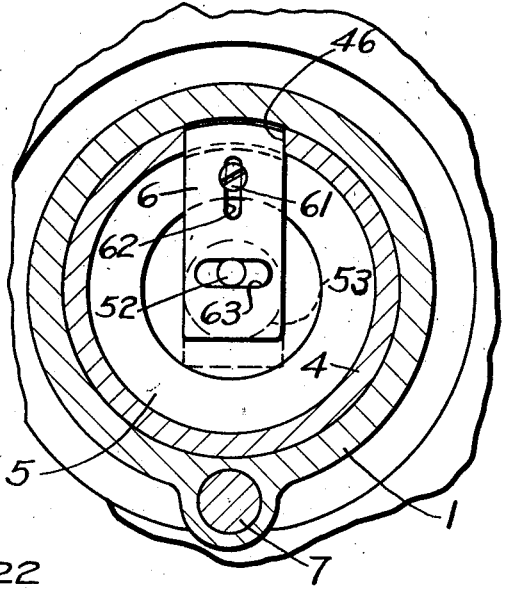

April 2, 1929.  W. A. CLENCH  1,707,458
RIM LOCK AND OPERATING MEANS THEREFOR
Filed Sept. 8, 1925  4 Sheets-Sheet 3
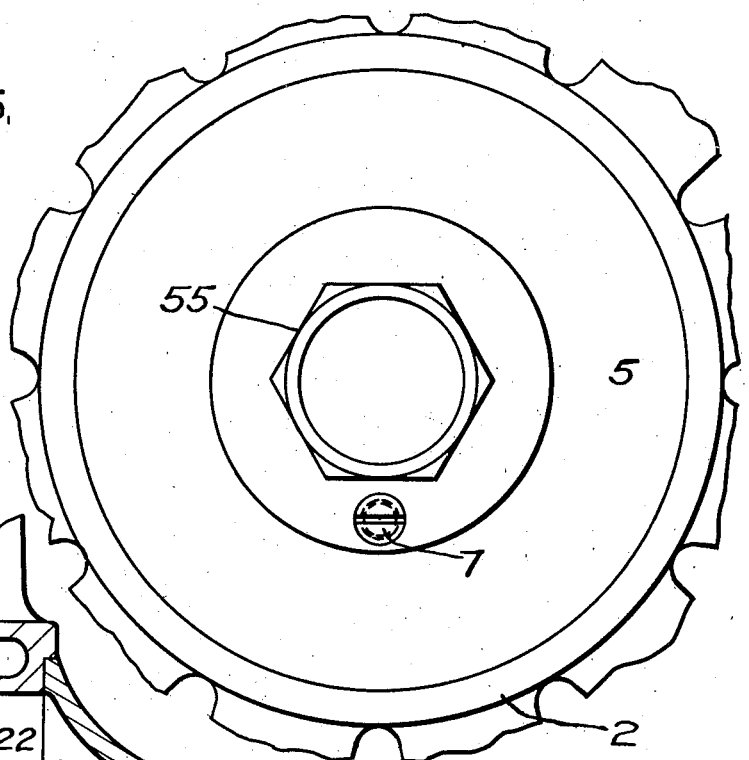
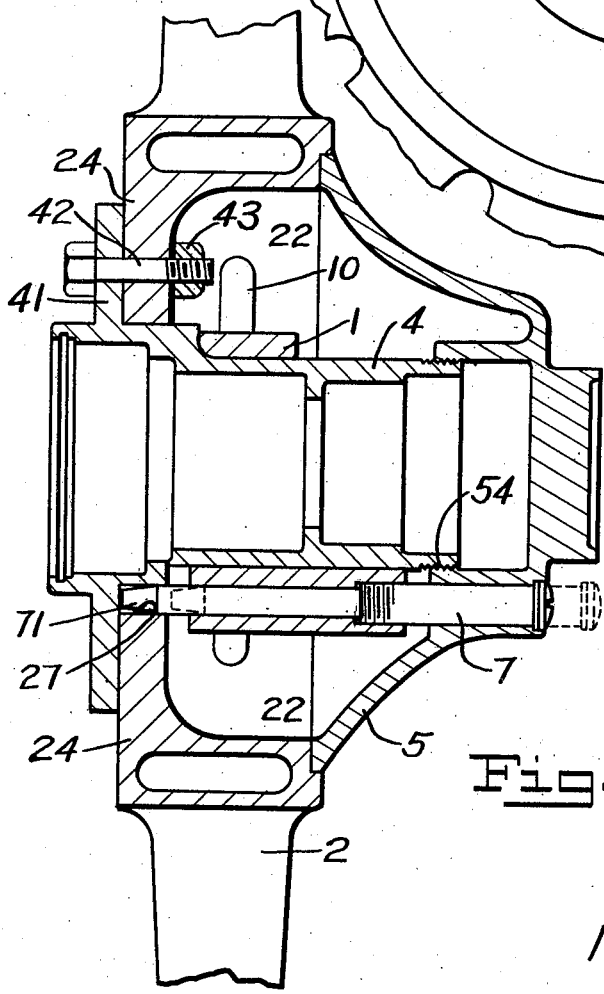
INVENTOR
William A. Clench
BY
ATTORNEYS April 2, 1929.   W. A. CLENCH   1,707,458
RIM LOCK AND OPERATING MEANS THEREFOR
Filed Sept. 8, 1925   4 Sheets-Sheet 4
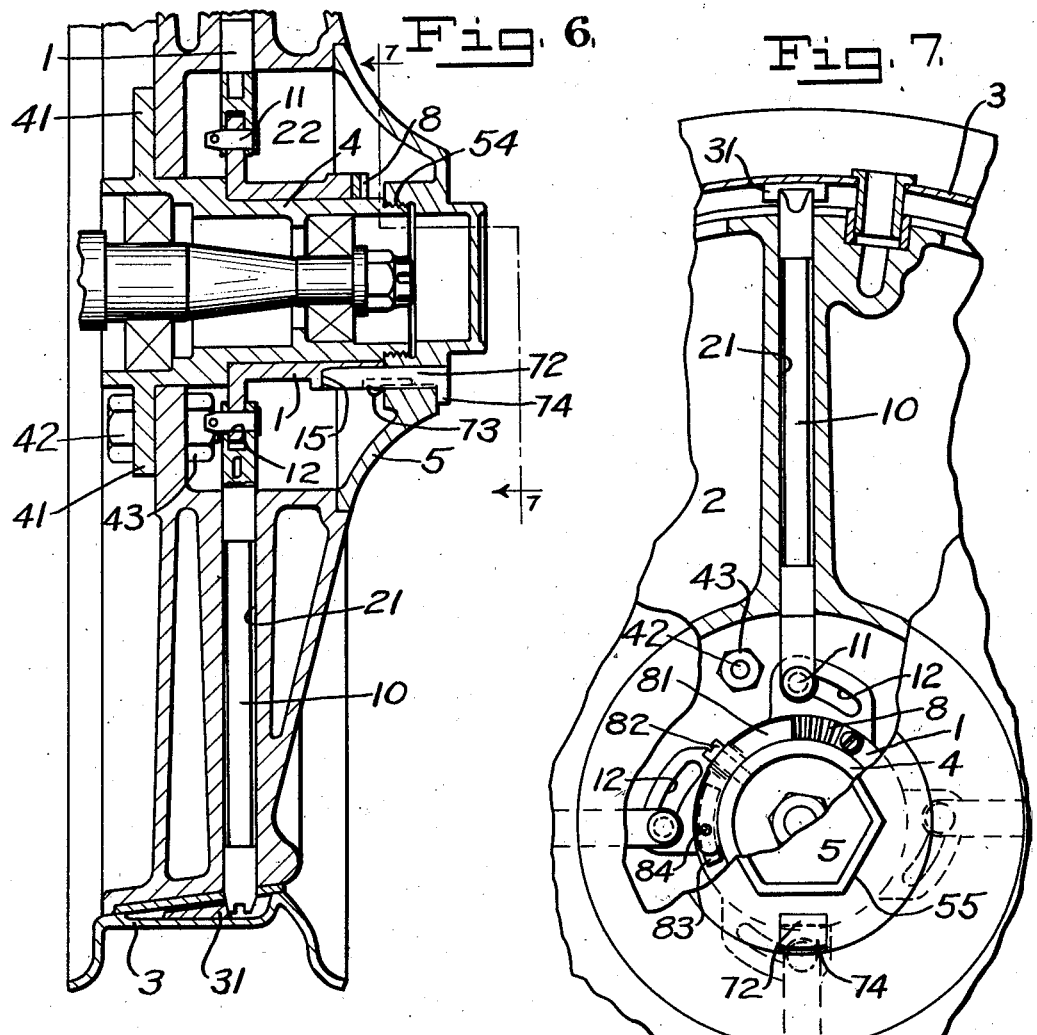
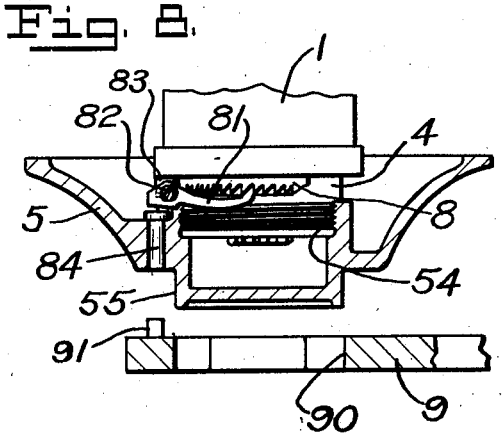
INVENTOR
William A. Clench
BY
H.L. + G.L. Reynolds
ATTORNEYS Patented Apr. 2, 1929.

1,707,458

UNITED STATES PATENT OFFICE.

WILLIAM A. CLENCH, OF ALAMEDA, CALIFORNIA, ASSIGNOR TO STANDARD DISK WHEEL COMPANY, OF SEATTLE, WASHINGTON, A CORPORATION OF WASHINGTON.

RIM LOCK AND OPERATING MEANS THEREFOR.

Application filed September 8, 1925. Serial No. 54,960.

My invention relates to vehicle wheels of the general type shown in my Patents Nos. 1,440,210 and 1,476,952. More generally stated, it relates to vehicle wheels intended for use with demountable rims, and has for an object the provision of means for securing the rims in place, the control of which, and the securing means for the wheel itself, being under control of a single locking member, whereby the unauthorized removal of the wheel itself, or the tire and rim from the wheel, is prevented, until the lock is properly unlocked or released.

More specifically, it is my object to provide means for use in connection with such a wheel, whereby the rim locking means can be actuated simply by limited movement of a hub-cap, less than sufficient to remove it from its point of securement, coupled with means for holding the hub-cap, the rim locking means, and the wheel against relative movement, except as and when desired.

A further object is the provision of a wheel, including a rim locking device, in which the rim locking device can be actuated from the hub cap without any external mechanism or members projecting to mar the appearance of the hub cap or wheel.

A further object is the general simplification and improvement of devices of the general type shown in my patents referred to above.

My invention comprises those novel parts and combinations thereof which are shown in the accompanying drawings, described in the specification, and particularly defined by the claims terminating the same.

The accompanying drawings show my invention in the forms which are now preferred by me.

Figure 2 is a transverse section through such a wheel as illustrated in Figure 1, on the line 1—1 thereof.

Figure 3 is a section on line 3—3 of Figure 2.

Figure 4 is a transverse section through the hub portion of a spoke wheel, showing the application of a modified form of my invention thereto, and Figure 5 is a face view thereof.

Figure 6 is a transverse section through the hub, wheel, body, felly, and rim of a wheel, illustrating a further modification of my invention, and Figure 7 is a part elevation and part section of the same form, substantially on the line indicated at 7—7 in Fig. 6.

Figure 8 is a detail elevation of the hub end, showing the hub cap and a hub cap wrench therefor in section.

Figure 1:
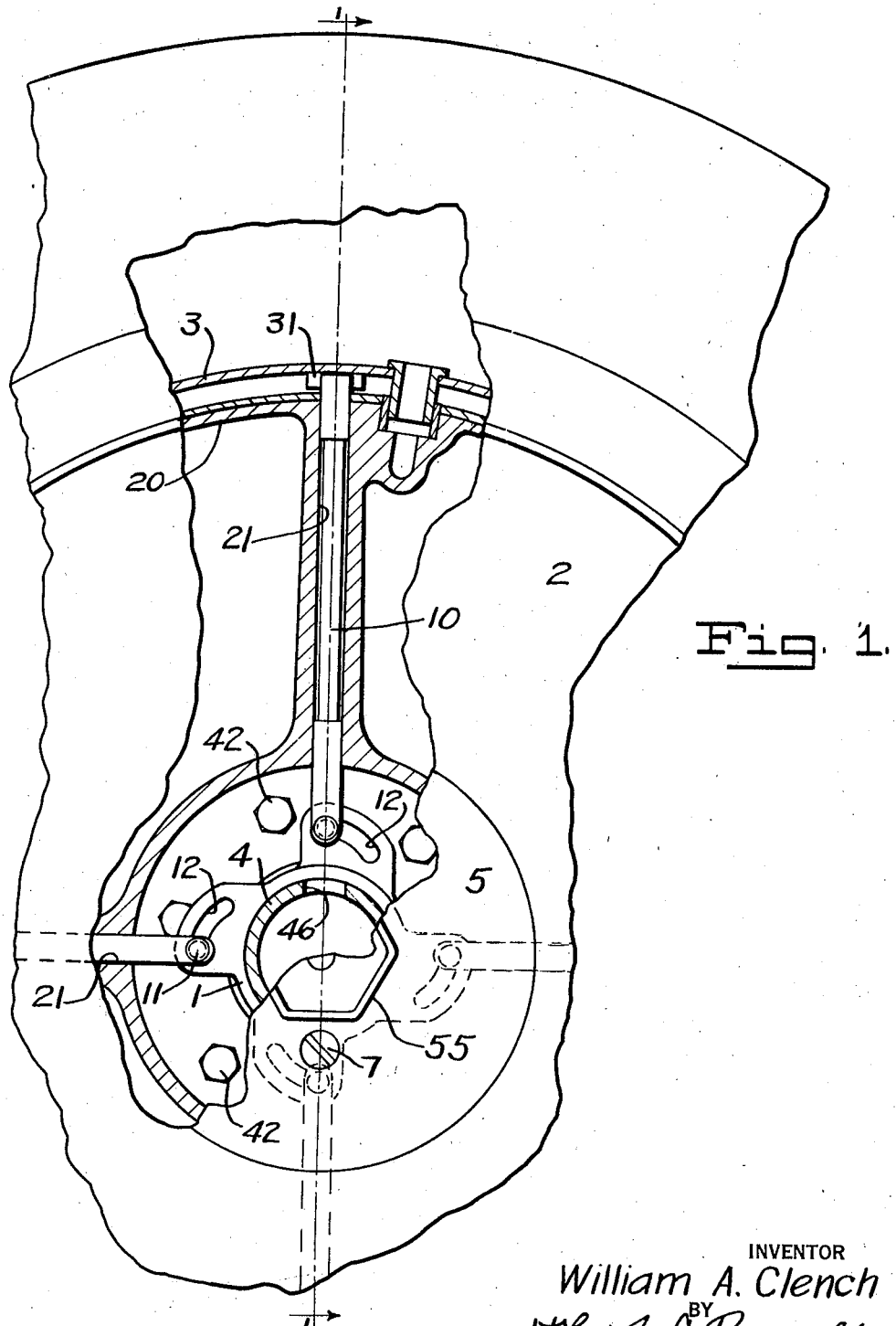
Figure 1 is an elevation of a portion of a disk wheel, including the hub, felly, rim, and tire, with parts broken away to show the rim lock and portions of the actuating and securing mechanism therefor.

It should be understood, in connection with the present invention, that the particular type of rim-locking device employed is largely immaterial, but this should include an actuator member, as the cam ring 1, which is included within the wheel at its hub and which is movable to operate the rim-locking means. As shown herein the rim-locking device comprises a plurality of bolts 10, reciprocable in guides 21 within the wheel 2, their outer ends being projectible beyond the felly 20 of the wheel to engage lugs 31 formed upon the rim 3. To retain this rim in place upon the wheel at their inner ends, these bolts 10 are provided with a pin 11, engageable in cam slots 12 of the actuator 1, by means of which the bolts 10 are projected or retracted upon slight rotary movement of the actuator.

The wheel is shown herein both as a disk wheel and as a spoke wheel; for the purposes of the present invention it may be of any type. It is formed with an axial chamber 22 which is open at its outer end, and the rear wall 24 of which is provided with an opening for the reception of a hub 4. The wheel and hub are suitably secured together, as, for example, by means of a hub flange 41 in contact with the exterior of the wheel at its inner side, and bolts 42 passing through the walls 24 of the chamber and the hub flange 41. These bolts are so secured that they are accessible only from the interior of the chamber 22 for removal. This may be done, as shown in Figure 2, by passing the bolt through the wall 24 and threading it into the flange 41 or, as shown in Figure 4, by passing the bolt through both the flange 41 and the wall 24 and securing a nut 43 upon the end of the bolt from within the chamber 22.

It will be understood from the drawings that the hub 4 projects within the axial chamber 22 of the wheel, which chamber surrounds the hub, and that in the form illustrated the actuator 1 is rotatively mounted upon the hub within the chamber. Thus it will be apparent that access must be had to the interior of the chamber to operate the actuator 1, and consequently to release or secure the rim 3. A hub cap 5 is secured in place to close the open end or the chamber 22, preferably by threading at 54 upon the end of the hub 4, and with this hub cap in place, access cannot be had either to the actuator or to the bolts 42 or nuts 43. Thus if the hub cap is locked in place, the wheel cannot be removed from the hub 4 nor can the actuator be tampered with to remove the tire and rim.

Any suitable means may be employed for locking the hub cap in place. As shown herein and as best illustrated in Figures 2 and 3, the hub cap may have mounted therein a lock-cylinder 51, suitably protected from the dust, accessible by a key 50 from without, and operable upon rotation to project or retract a locking bolt 6, by means of which the hub cap may be secured to some fixed member, as, for example, the hub 4. To this end a slot 46 is provided in the hub 4, and the locking bolt 6, which is shown as secured to the hub cap by means of a screw 61 retained in a slot 62, may be engaged with or disengaged from the slot 46 by its reciprocation by the rotatable lock shaft (not shown), forming a part of the lock contained in the cylinder 51, as is customary. Reciprocation of the bolt 6 may be secured in any suitable manner, and as shown herein a pin 52, set eccentric of the axis of the lock shaft and carried by a disk 53 rotatable with the said lock shaft (see Figure 3), engages in a transverse slot 63 in the bolt 6, whereby it may be projected into the full-line position of Figure 3, or retracted into the the dotted-line position thereof, out of engagement with the slot 46.

It is generally desirable to operate the actuator 1 without complete removal of the hub cap 5, and this can be done by providing a suitable connection between them, which is disengageable to permit removal of the hub cap whenever this is desired. Such a connection will not operate in any way to lessen the safety afforded by the locking bolt 6, for it is evident that unless the hub cap itself can be rotated, the actuator 1 cannot be rotated, and consequently the rim locking bolts 10 cannot be withdrawn. In Figure 2 the connection between the hub cap and actuator is shown in the form of a bolt or pin 7 passing through a hole 55' in the hub cap and threaded into a socket 15 in the actuator. So long as the bolt 7 is secured in the hub cap and in the actuator 1, these two elements will turn as a unit, and limited movement of the hub cap, less than sufficient to remove it, will rotate the actuator sufficient to operate the rim locking device.

In Figure 4 the bolt 7 has been shown as provided with an extension 71 extending entirely through the actuator 1 and received in a socket 27 in the rear wall 24 of the wheel chamber. So long as the tip 71 remains engaged in its socket 27, it is clear that the hub cap cannot be rotated relative to the hub (for the wheel and hub are secured together by the bolts 42), nor can the actuator be rotated relative to the wheel or hub. The hub cap, the hub, and the actuator, are thus secured together as a single unit, and in order to permit actuation of the rim lock, it is necessary to withdraw the bolt 7 sufficiently to disengage its tip 71 from the socket 27, as shown in dotted lines in Figure 4, whereupon the device is operable in the same manner as the form which is shown in Figure 2. The form as shown in Figure 4 omits the lock cylinder 51, which may be employed or not, as desired, it being the intention to provide, in the form shown in Figure 4, merely a means of operating the actuator by limited movement of the hub cap and to prevent accidental rather than unauthorized actuation of the actuator by engagement of the tip 71 in its socket. In effect the tip 71 forms a separate member connecting the actuator and the wheel or hub, this separate member being in effect operated through the pin 7.

In the form shown in Figures 6, 7 and 8, as in the form shown in Figures 4 and 5, no key-controlled lock-cylinder is shown, but this may be employed nevertheless, it being the intention in the provision of this form to permit the actuator to be operated through limited movement of the hub cap, but to secure one of these elements, as the actuator, to the hub in such a way that it may only be released for actuation through the employment of a proper hub cap wrench or like tool. Thus a person not possessing the proper hub cap wrench, and attempting to operate the device with an ordinary wrench, would find himself unable either to turn the hub cap to remove the wheel, or to turn the actuator to remove the rim and tire.

In this form the hub cap 5 and the actuator 1 are connected by a pin 72, corresponding to the pin 7 but held in engagement in its socket 15 by means of a spring 73, thus permitting its removal by the employment of a screw driver or the like inserted beneath the head 74 of the pin. By such means, or their equivalent, the actuator 1 and hub cap 5 are secured together.

In order to prevent rotation of the actuator merely upon engagement of the hub cap and turning the same with any ordinary wrench, I provide a curved ratchet bar 8, and a cooperating pawl 81, these two elements being secured upon two different members which must move relatively to permit operation of the actuator 1. For example, the ratchet bar 8 may be secured upon the end face of the actuator 1, and the ratchet pawl 81 upon the hub 4. Normally the pawl is suitably held in engagement with the ratchet bar 8, as by means of a spring 83. The teeth in this ratchet bar 8 are so positioned, as shown in Figure 8, that they will resist counterclockwise rotation of the actuator 1, that is, rotation in a direction to remove the hub cap and to operate the actuator, assuming the threads 54 to be right-handed. Thus, any attempt to remove the hub cap 5, and consequently to rotate the actuator through the pin 72, will be resisted by the engagement of the pawl 81 with the ratchet bar 8.

When it is desired to rotate the hub cap, either to remove it or to operate the actuator 1, a special hub cap wrench 9, having an operature 90 to receive the non-circular portion 55 of the hub cap, is placed in position thereon. This is provided with a stud 91 projecting toward the hub cap and adapted to engage a release pin 84 reciprocable in the hub cap and positioned to engage the pawl 81 in such a manner that when pressed inward it will release the pawl from engagement with the ratchet bar 8. Thus with the special wrench 9 in position on the hub cap, the hub cap may be rotated. The pawl 81 and the ratchet bar 8 are held apart, in replacing the hub cap, by means of the same stud 91.

What I claim as my invention is:

1. In combination with a hub, a vehicle wheel including an open-ended chamber receiving and surrounding said hub, rim locking means extending within said chamber, means within said chamber and movable relative to the wheel to actuate said rim locking means, a hub cap securable within the open end of said chamber to close it, and means connecting said hub cap and actuator to move the latter for operation of the rim lock upon movement of the hub cap.

2. In combination with a hub, a vehicle wheel including an open-ended chamber about the hub, rim locking means extending within said chamber, means rotatable within said chamber relative to the wheel to actuate said rim locking means, a hub cap threaded upon said hub, and means connecting said hub cap and actuator, to rotate the latter for operation of the rim lock upon movement of the hub cap less than sufficient to remove it.

3. In combination with a hub, a vehicle wheel including an open-ended chamber receiving and surrounding said hub, rim locking means extending within said chamber, means within said chamber and movable relative to the wheel to actuate said rim locking means, a hub cap securable within the open end of said chamber to close it, means connecting said hub cap and actuator to move the latter for operation of the rim lock upon movement of the hub cap, and means for locking the hub cap and actuator against unauthorized movement.

4. In combination with a vehicle wheel including an axial open-ended chamber, a hub projecting into said chamber, means, accessible only from within said chamber, for securing the wheel upon said hub, a hub cap for closing the end of said chamber, and means for preventing unauthorized removal of said hub cap.

5. In combination with a device as in claim 4, rim locking means extending with said chamber in the wheel, an actuator therefor movable within the chamber, and means normally connecting said actuator and hub cap for movement of the former to actuate the rim lock upon limited movement of the latter.

6. In combination with a device as in claim 4, rim locking means extending within the chamber in the wheel, an actuator therefor movable within the chamber, and means normally preventing relative movement of the actuator, the hub cap, and the hub, and releasable from the hub at will to permit movement of the actuator to actuate the rim lock upon limited movement of the hub cap.

7. In combination with a vehicle wheel including an open-ended hub chamber, rim locking means extending within said chamber, actuator means within said chamber and movable relative to the wheel, and operatively connected to said rim locking means, a hub cap closing the end of said chamber, a hub projecting into said chamber and secured to the wheel, and means normally preventing relative movement of the hub, the hub cap, and the actuator.

8. In combination with a vehicle wheel including an axial open-ended chamber, rim locking means extending within said chamber, actuator means within said chamber and movable relative to the wheel, and operatively connected to said rim locking means, a hub cap closing the end of said chamber, a hub projecting into said chamber and secured to the wheel, means normally preventing relative movement of the hub, the hub cap, and the actuator, including a lock for securing one of the other members thus connected positively to the hub.

9. In combination with a vehicle wheel including an axial open-ended chamber, rim locking means extending within said chamber, actuator means within said chamber and movable relative to the wheel, and operatively connected to said rim locking means, a hub cap closing the end of said chamber, a hub projecting into said chamber and secured to the wheel, and means normally preventing relative movement of the hub, the hub cap, and the actuator, including key-controlled means for locking the hub cap to the hub.

10. In combination with a vehicle wheel including an axial open-ended chamber, a hub projecting into said chamber, a hub flange externally of the wheel, bolts passing through said hub flange and wheel into the chamber, said bolts being accessible for removal only from within the chamber, rim locking means extending within the chamber, actuator means within said chamber and movable relative to the wheel, and operatively connected to said rim locking means, a hub cap closing the end of said chamber, and means normally preventing relative movement of the hub, the hub cap, and the actuator, including a lock to prevent unauthorized removal of said hub cap.

11. A device as in claim 4, the hub cap threading upon the hub, and a locking bolt carried by said hub cap and engageable at will with said hub constituting the means for preventing unauthorized removal of the hub cap.

12. A device as in claim 4, the hub cap threading upon the hub, the hub having a slot therein, and a locking bolt and lock shaft carried by the hub cap, the lock shaft being operable to project and retract the bolt to engage or disengage said slot in the hub, constituting the means for preventing unauthorized removal of the hub cap.

13. In combination with a vehicle wheel having a hub chamber, a rim removably securable upon the felly of said wheel, means operable from within said chamber for securing or releasing said rim, and means for closing said chamber, said two means being connected for actuation of the former by the latter.

14. In combination with a vehicle wheel having an axial chamber, a rim removably securable upon the felly of said wheel, means operable from within said axial chamber for securing or releasing said rim, means for closing said chamber, said two means being connected for actuation of the former by the latter, and means for locking the two means thus connected in rim-secured position.

15. In combination with a vehicle wheel having an axial chamber, a rim removably securable upon the felly of said wheel, means operable from within said axial chamber for securing or releasing said rim, means for closing said chamber, said two means being connected for actuation of the former by the latter, and means for locking the chamber-closing means against unauthorized movement, thereby to secure the rim-securing means in rim-secured position.

16. In combination with a wheel having an axial chamber, a rim removably securable upon the felly of said wheel, means operable from within said axial chamber for securing or releasing said rim, a hub cap threading in position to close said chamber, and releasable means connecting said rim-securing means to said hub cap for actuation of the former upon limited movement of the hub cap relative to the wheel.

17. In combination with a vehicle wheel including a hub chamber, rim locking means, an actuator in the hub chamber and movable relative to the wheel to actuate said rim lock, a hub cap securable within the end of the hub chamber to close it, and means connecting the hub cap and actuator to move the latter upon movement of the hub cap.

18. In combination with a vehicle wheel including a hub chamber, rim locking means, an actuator in the hub chamber and movable relative to the wheel to actuate said rim lock, a hub cap securable within the end of the hub chamber to close it, and means connecting the hub cap and actuator to move the latter upon movement of the hub cap.

19. In combination with a vehicle wheel including a hub chamber, rim locking means, an actuator in the hub chamber and movable relative to the wheel to actuate said rim lock, a hub cap securable within the end of the hub chamber to close it, and means for connecting the hub cap, actuator, and wheel together to prevent relative movement therebetween.

20. In combination with a vehicle wheel including a hub chamber open at its outer end, a flanged hub projecting through said chamber, wheel securing bolts passing through the flange of said hub and through the inner wall of said chamber, and accessible only from within the chamber, rim-locking means extending within said chamber and including a member oscillable about said hub through a limited movement to move the rim lock into rim-secured or released position, a hub cap closing the end of said chamber, and means normally preventing relative movement of the hub, the hub cap, and the rim lock.

21. A wheel construction comprising a hub adapted to be secured upon an axle, a wheel body secured upon the hub, and having a chamber receiving the hub, a hub cap closing said chamber, means for securing the wheel to the axle, means for securing a rim to the wheel, both of said means being engageable only from within said chamber, and a lock for said hub cap, whereby said lock controls the releasing of the wheel from the hub and the rim from the wheel.

22. In combination with a vehicle wheel including a hub chamber, rim locking means, an actuator in the hub chamber and movable relative to the wheel to actuate said rim lock, a hub cap securable within the end of the hub chamber to close it, and means selectively connecting the hub cap and actuator to permit actuation of the rim lock, or connecting the hub cap, actuator, and wheel to prevent actuation of the rim lock.

23. In combination with a vehicle wheel including an axial open-ended chamber, rim locking means extending within said chamber, actuator means within said chamber and movable relative to the wheel, and operatively connected to said rim locking means, a hub cap closing the end of said chamber, and a bolt securable in the actuator and hub cap, and accessible from without the hub cap, to secure the hub cap and actuator together for operation of the rim lock through movement of the connected actuator and hub cap.

24. In combination with a vehicle wheel having a hub chamber, a rim removably securable upon the felly of said wheel, means operable from within said chamber for securing or releasing said rim, means for closing said chamber, and a bolt passing through said two means to connect them for actuation of the former by the latter.

25. In combination with a vehicle wheel including a hub chamber, rim locking means, an actuator movable within the hub chamber relative to the wheel, and operatively connected to said rim locking means, a hub cap closing the end of said chamber, and means normally connecting the actuator and hub cap, and removable to permit removal of the hub cap, to secure the hub cap and actuator together for operation of the rim lock through movement of the connected actuator and hub cap.

Signed at Seattle, King County, Washington this 1st day of September, 1925.

WILLIAM A. CLENCH.